United States Patent [19]

Enomoto

[11] Patent Number: 5,265,820
[45] Date of Patent: Nov. 30, 1993

[54] PHOTOGRAPHIC FILM CASSETTE

[75] Inventor: Masahiro Enomoto, Kanagawa, Japan

[73] Assignee: Fuji Photo Film Co., Ltd., Kanagawa, Japan

[21] Appl. No.: 797,890

[22] Filed: Nov. 26, 1991

[30] Foreign Application Priority Data

Nov. 26, 1990 [JP] Japan ................................ 2-324890
Jul. 8, 1991 [JP] Japan .................................. 3-19342

[51] Int. Cl.5 .......................................... G03B 17/26
[52] U.S. Cl. .................................. 242/71.1; 242/71.8; 354/275
[58] Field of Search ....................... 242/71, 71.1, 71.7, 242/71.8, 71.9; 354/275; 156/73.1, 309.6, 310

[56] References Cited

U.S. PATENT DOCUMENTS

| | | | |
|---|---|---|---|
| 4,524,920 | 6/1985 | Kidawara | 242/71.1 |
| 4,616,914 | 10/1986 | Buelens | 242/71.1 X |
| 4,832,275 | 5/1989 | Robertson | 242/71.1 |
| 4,834,306 | 5/1989 | Robertson | 242/71.9 X |
| 4,846,418 | 7/1989 | Fairman | 242/71.1 |
| 4,883,236 | 11/1989 | Niedospial | 242/71.9 X |
| 4,887,776 | 12/1989 | Niedospial | 242/71.1 |
| 4,889,292 | 12/1989 | Loewe | 242/71.1 |
| 5,009,372 | 8/1991 | Loewe | 242/71.1 |
| 5,049,928 | 9/1991 | Tirone | 242/71 X |
| 5,083,720 | 1/1992 | Niedospial | 242/71.1 |
| 5,115,268 | 5/1992 | Kitagawa | 242/71.1 X |

FOREIGN PATENT DOCUMENTS

| | | |
|---|---|---|
| 50-33831 | 4/1975 | Japan . |
| 57-190948 | 11/1982 | Japan . |
| 62-286043 | 12/1987 | Japan . |
| 2-264941 | 10/1990 | Japan . |
| 3-37645 | 2/1991 | Japan . |

*Primary Examiner*—Daniel P. Stodola
*Assistant Examiner*—Eileen Dunn
*Attorney, Agent, or Firm*—Sughrue, Mion, Zinn, Macpeak & Seas

[57] ABSTRACT

A cassette shell consists of two shell halves, and rotatably contains a spool core on which a photographic film is wound. A pair of spool flanges are loosely fitted on the spool core. Rotation of the spool core causes a film leader to advance through a film passage slit. A melting point of resin for molding the spool flanges is different from that of resin for molding the cassette shell for the purpose of avoiding undesired ultrasonic welding on their contact surfaces when joining the shell halves. The spool flanges are molded from material including polyolefin resin having a high density and a high molecular weight in order to reduce friction against the cassette shell and the photographic film.

21 Claims, 10 Drawing Sheets ously undesired welding on the contact

PHOTOGRAPHIC FILM CASSETTE

BACKGROUND OF THE INVENTION

1. Field of the Invention

The present invention relates to a photographic film cassette, more particularly to an improvement of a photographic film cassette in which rotation of a spool core causes a film leader to advance to the outside of a cassette shell.

2. Description of the Related Art

A conventional film cassette includes 35 mm photographic film positioned therein so that the film leader does not protrude from the cassette shell prior to loading the film cassette in a camera. Such a film cassette is easily loaded onto a camera. Simple feeding mechanisms are used with this type of film cassette and include a construction which rotates the spool core to unwind the photographic film, thereby causing the film leader to move through a film passage slit and exit from the film cassette Examples of such a conventional film cassette are disclosed in U.S. Pat. Nos. 4,832,275, 4,834,306, 4,846,418 and 4,883,236 and Japanese Patent Laid-open Publication No. 3-37645.

In devices disclosed by the above-mentioned references, the roll of photographic film wound about the spool core is prevented from loosening in order to transmit rotation of the spool core to the film leader. In U.S. Pat. No. 4,832,275 for example, a pair of rotatable rings are provided on the cylindrical surface of the inside of the cassette shell so as to abut the outermost turn of the roll of film. In Japanese Patent Laid-open Publication No. 3-37645, which has a publication date after the priority date of the present application, a pair of annular ridges are formed on lateral surfaces of the inside of the cassette shell in order to press the spool flanges inwardly so that the roll of film is clamped between the spool flanges In U.S. Pat. No. 4,834,306, circumferential lips are formed around the spool flanges so as to abut the outermost turn of the roll. To direct the film leader toward the outside of the cassette shell, the film cassette of U.S. Pat. No. 4,834,306 has a pair of spreading projections formed inwardly from the film passage slit for deforming and spreading the spool flanges so as to release the outermost turn from circumferential lips.

To produce the cassette shell of such conventional designs, molding resin, e g , thermoplastic resin, is very advantageous as it is convenient and inexpensive. Japanese Patent Laid-open Publication Nos. 50-33831 and 57-190948 disclose that it is desirable to construct the cassette shell from a plurality of, e.g., two, molded shell components. Junction of these shell components is performed by the use of ultrasonic welding or application of an adhesive agent. The ultrasonic welding is particularly advantageous because it is less laborious than applying the adhesive agent, effective for a large area to be joined, and suitable for mass production.

However, unnecessary welding might take place on surfaces of the spool core or the spool flanges in contact with the cassette shell while the shell components are joined by applying ultrasonic waves. This is because the spool flanges or the circumferential lips are in constant contact with the annular ridges or the spreading projections with mutual pressure for the purpose of propelling a film leader. In the case of such undesired welding, the film leader can not be properly propelled even when the spool core is rotated in the film unwinding direction.

Moreover, contact between the above-mentioned members involves considerable friction which enlarges the necessary torque to be applied to the spool core for rotating it. Friction of lateral sides of the photographic film against the spool flanges or the circumferential lips also increases the torque necessary for rotating the spool core.

There is a proposal, as disclosed in Japanese Patent Laid-open Publication Nos. 62-286043 and 2-264941, to reduce the influence of friction in a film cassette of the conventional type between the spool core and its bearing holes or between the spool flanges and the end faces of the roll of film. This proposal is based upon an improvement of the resin for molding the spool. It is, however, difficult in these film cassettes of leader-propelled type, to effectively reduce the friction between the relevant members by the sole use of the improved material as disclosed in these references.

SUMMARY OF THE INVENTION

In view of the foregoing problems, an object of the present invention is to provide a photographic film cassette in which rotation of the spool core reliably advances the film leader to the outside of the cassette shell.

Another object of the present invention is to provide a photographic film cassette in which ultrasonic welding is avoided on contact surfaces other than those of the shell components to be joined together.

Still another object of the present invention is to provide a photographic film cassette in which friction between contact surfaces of the spool flanges in contact with the cassette shell, and/or the photographic film, is reduced.

In order to achieve the above and other objects and advantages of this invention, a spool core, on which a photographic film of a photographic film cassette is wound in a roll is rotatably contained in a cassette shell constituted of two shell components. A pair of flanges are provided on the spool core. A film leader is propelled to an outside of the cassette shell by rotating the spool core. To avoid undesired ultrasonic welding when the cassette shell is joined together, the melting point of the resin of the spool flanges is higher than that of the cassette shell and/or the spool core. The difference in the melting point between the resin used for molding the spool flanges and the resin used for molding the cassette shell and/or the spool core is preferably at least 20° C.

In accordance with a preferred embodiment, a spool is constructed of two molded spool pieces, axially slidable relative to each other, provided with respective spool flanges. There is a predetermined difference in the melting point between the resin used for molding one of the spool pieces and the resin used for molding the cassette shell and/or the spool piece The predetermined difference is preferably at least 20° C. To avoid undesired ultrasonic welding when the cassette shell is joined together, the melting point of the resin of the former spool piece is higher than that of the cassette shell and/or the other spool piece. It is therefore possible to avoid undesired ultrasonic welding on the contact surfaces other than those of the shell components to be joined together Further, the spool flanges are molded from a material including polyolefin resin having a density of at least 0.940 g/cm$^3$ and a molecular weight of between 100,000 and 1,000,000 in order to reduce friction against the cassette shell and the photographic film.

In another preferred embodiment, a looseness preventing device is provided with the spool flanges for contact with an outermost turn of the roll of film so as to prevent the photographic film from loosening. The looseness preventing device is molded from material including the above-mentioned polyolefin resin having a high density and molecular weight in order to reduce friction against the photographic film. It is thus possible to reduce the friction between the contact surfaces of the spool flanges or the circumferential lips in contact with the cassette shell and/or the photographic film. Thus, rotation of the spool core reliably causes the film leader to advance to the outside of the cassette shell.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
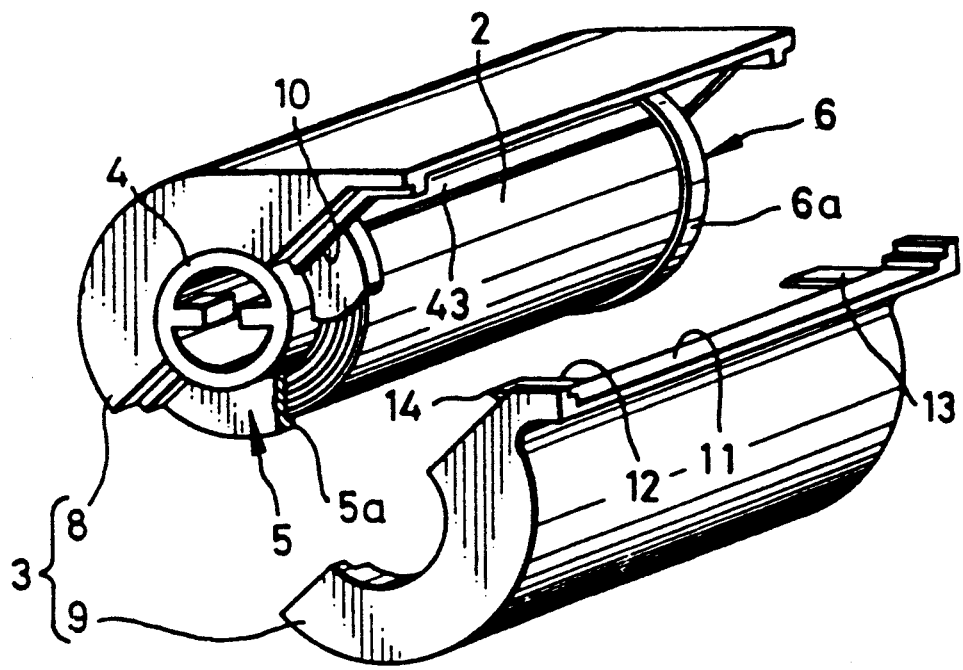
FIG. 1 is an exploded perspective view illustrating a photographic film cassette according to the first preferred embodiment of the present invention.

Referring to FIGS. and 2 illustrating the present invention, a photographic film cassette consists of a photographic film 2 and a cassette shell 3 for containing the photographic film 2 in a light-tight fashion. The photographic film 2 is wound on a spool core 4. Perforations (not shown) are formed in the photographic film 2 along both lateral edges in a conventional manner. However, one perforation for each frame may be provided for positioning the frame on the exposure aperture of a camera.

The spool core 4 is molded from polystyrene (PS), acrylonitrile-butadiene-styrene (ABS) resin or the like, and is supported rotatably in the cassette shell 3. Spool flanges or disks 5 and 6, rotatably fitted on each end of the spool core 4, are molded from a resin having a melting point that is different from that of the spool core 4, such as polypropylene (PP), polyethelene (PE), ethylene-vinyl acetate copolymer (EVA), polycarbonate (PA) and nylon. The "melting point" as referred to herein is the temperature at which the surface of a solid object is melted and starts to deform and is, for example, the Vicat softening point (ASTM D1525: with a load of 1 kg). The melting point of the spool core 4 is lower by at least $-20°$ C. than that of the disks 5 and 6. The resin forming the disks 5 and 6 is highly elastic, and has a low coefficient of friction with respect to the photographic film 2.

Circumferential lips 5a and 6a are formed integrally with the disks 5 and 6 on the circumference thereof to project toward the inside. The lips 5a and 6a are in contact with the outermost turn of the roll of film 2 on the lateral sides so as to prevent the roll of film 2 from loosening. A leader 43 of the photographic film 2 is rotated in accordance with the rotation of the spool core 4.

The cassette shell 3 consists of a pair of shell halves 8 and 9 joined together. Shell halves 8 and 9 are molded from PS resin, so as to provide the cassette shell 3 with a light-tight capacity. The melting point of the resin used to form shell halves 8 and 9 has a melting point that is different, by at least 20° C., from that of the material used to form disks 5 and 6. Stepped edges 10 are formed on shell halves 8 and 9 so as to facilitate fitting and serve for being welded by an ultrasonic wave process.

Figure 2:
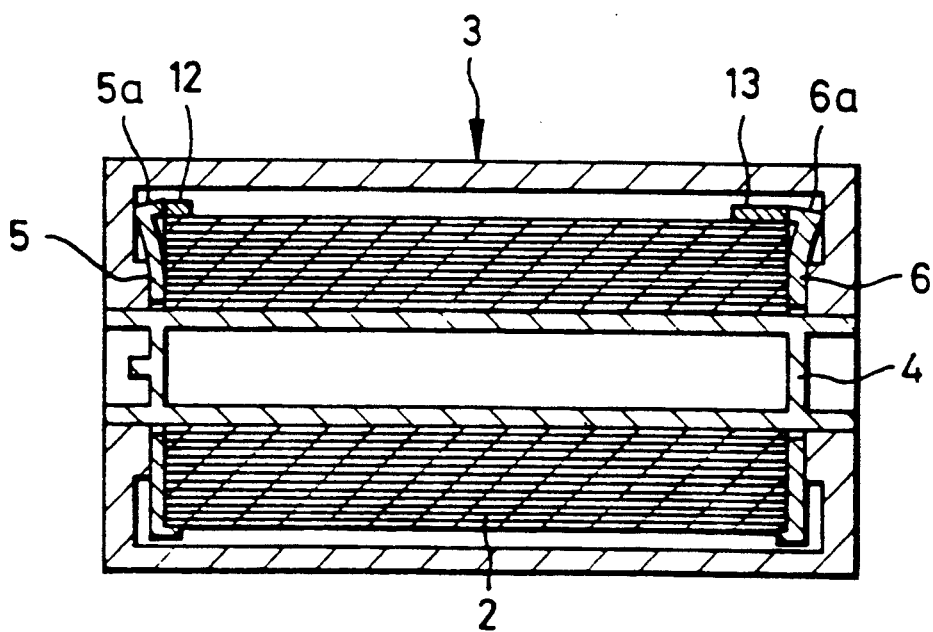
FIG. 2 is a cross section illustrating the film cassette of FIG. 1.

A film passage slit 11 is formed in the cassette shell 3 between the shell halves 8 and 9, and provided with fabric pieces 73 and 74 of plush or light-trapping fabric, such as teremp cloth, in a conventional manner (see FIG. 8) for preventing outer light from passing into the film passage slit 11. A pair of spreaders 12 and 13 are integrally formed on the lower shell half 9 so as to be in contact with the circumferential lips 5a and 6a as illustrated in FIG. 2. Spreaders 12 and 13 spread the lips 5a and 6a, in order to release the film leader 43 therefrom. A separating claw 14 is formed on the end of the spreader 12, and separates the film leader 43 from the roll of film 2 to propel it to the film passage slit 11.

The film leader 43 is then caught by the outer circumference of a film take-up reel in the camera (not illustrated). Thereafter, the spool core 4 becomes freely rotatable so that the photographic film 2 is pulled farther out of cassette shell 3 by the rotation of the film take-up reel. When the diameter of the roll of film 2 about the spool core 4 is smaller, after further drawing out of the photographic film 2 by the film take-up reel, the circumferential lips 5a and 6a cease to abut an outermost turn. The disks 5 and 6 then stop rotating due to the decrease in the force due to engagement between the rolls of film 2 and disks 5 and 6. Accordingly, the roll of film 2 now rotates together with the spool core 4 in rubbing contact with the inside surfaces of the disks 5 and 6.

The operation of assembling the photographic film cassette as constructed above will now be described. The disks 5 and 6 are fitted on respective ends of the spool core 4 having the photographic film 2 wound thereon. The disks 5 and 6 are fitted on both sides of the roll of film 2 to keep it from loosening. The disks 5a and 6a are in contact with the spool core 4 over contact areas of narrow width, and supported rotatably thereby. When the shell halves 8 and 9 are fitted together, with the spool core 4 and the roll of film 2 contained therebetween, the shell halves 8 and 9 are in contact with each other via the stepped edges 10 over contact surfaces of a relatively large area. Because the elasticity of the disks 5 and 6 is high, the pressure between the spreaders 12 and 13 and the disks 5a and 6a is reduced. The cassette shell 3 still rotatably supports the spool core 4, as their contact areas have a small width and thus a relatively low fictional force is present at their interface.

Heating efficiency of an ultrasonic vibration process is larger as the contact area becomes larger or as the pressure of contact is higher. The ultrasonic vibration applied to the shell halves 8 and 9 welds the stepped edges 10, as the surfaces to be welded are of the same material and have a lower melting point than the disks 5 and 6. Although the spreaders 12 and 13 are pressed against the circumferential lips 5a and 6a, they will not be welded together because the disks 5 and 6 are molded from a resin having a higher melting point and the ultrasonic waves are set so as to cause temperatures that are too low to melt the disks 5 and 6. Thus the film leader 43 can be propelled to the outside of the cassette shell 3, because only the shell halves 8 and 9, and not the disks 5 and 6 are welded when the ultrasonic wave is applied.

If there is an irregularity on any of the contact surfaces, it might scratch the opposite contact surface when the ultrasonic vibration is applied. It is therefore necessary to fashion the disks 5 and 6, the spreaders 12 and 13, the cassette shell 3 and the spool core 4 to have smooth and flat contact surfaces This also causes the load for driving the spool core 4 to become smaller because scratches can increase frictional forces.

Figure 3:
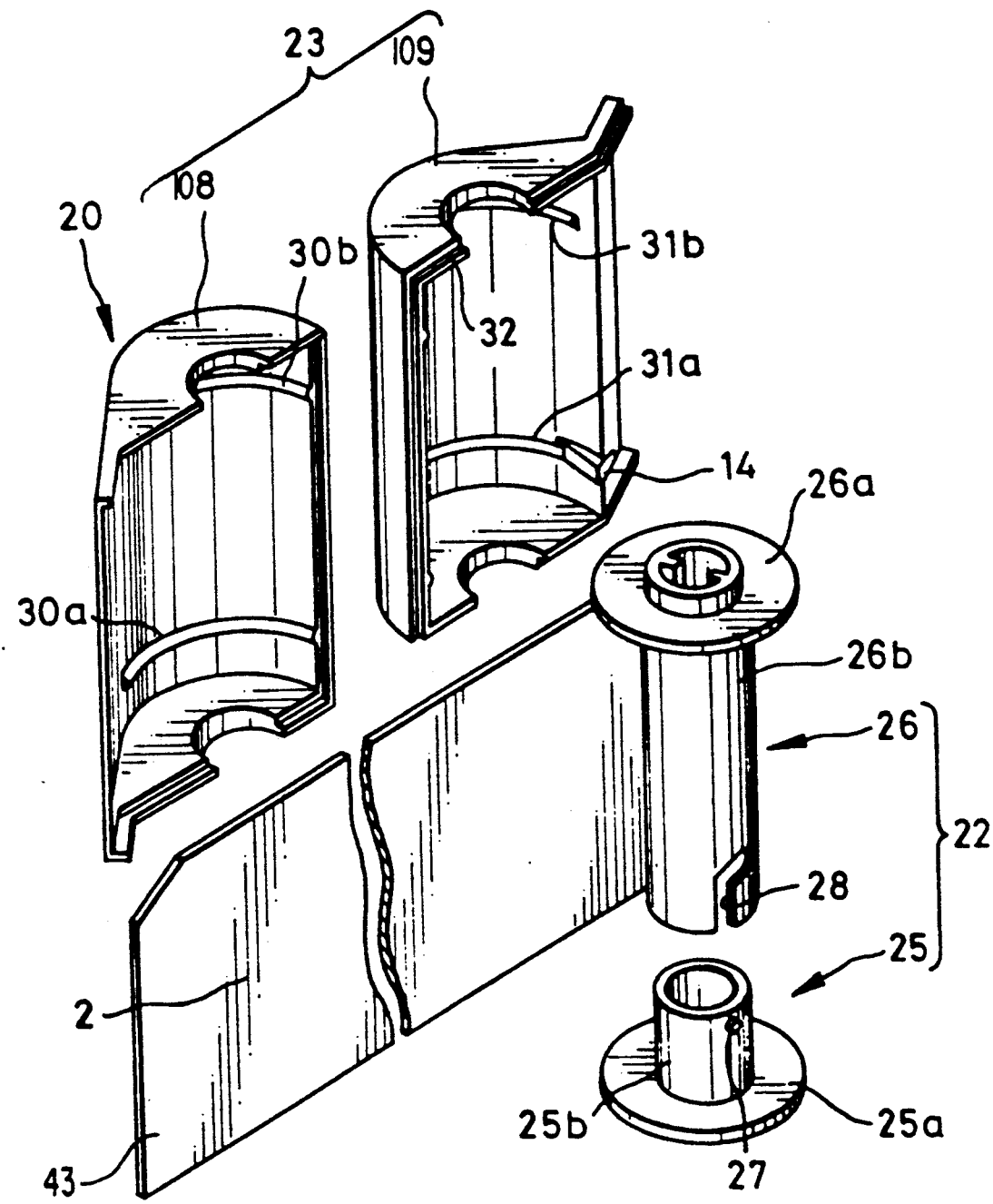
FIG. 3 is an exploded perspective view illustrating a film cassette according to a second preferred embodiment.

FIG. 3 illustrates a second preferred embodiment. The roll of film 2 contained in a film cassette 20 is clamped between spool flanges, whereby rotation of the spool 22 is transmitted to the film leader 43 to be propelled outside of the film cassette 20. The film cassette 20 consists of the photographic film 2, the spool 22 for winding the photographic film 2, and a cassette shell 23 for rotatably containing the spool 22. The spool 22 is constituted of first and second spool pieces 25 and 26 molded from two different resins. Whereas the first spool piece 25 is molded from PS or ABS resin, or the like, the second spool piece 26 is molded from PP, PE, EVA, PC or nylon, for example. The material of the second spool piece 26 has a high elasticity, is slippery against the photographic film 2, and has a melting point higher, by at least 20° C., than that of the first spool piece 25.

The first spool piece 25 consists of a spool flange 25a and a shaft portion 25b. A follower pin 27 is formed on the cylinder of the shaft portion 25b. The second spool piece 26 consists of a spool flange 26a and a shaft portion 26b for receiving the shaft portion 25b and engaging with the follower pin 27. The shaft portions 25b and 26b are in contact over rather a large area. When the first spool piece 25 is rotated, the second spool piece 26 is driven to rotate in concert with the former without axial deviation.

Figure 4:
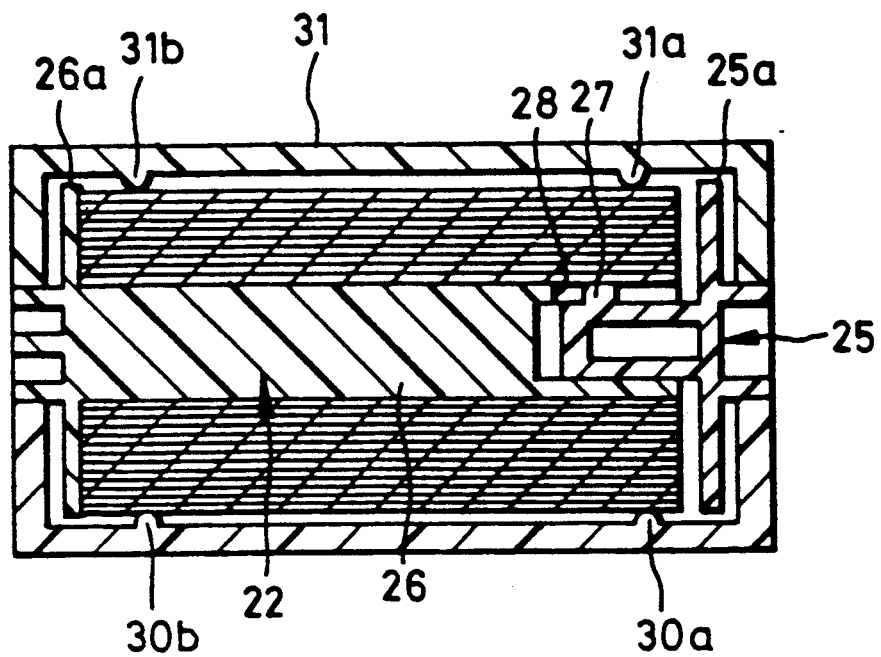
FIG. 4 is a cross section illustrating a state where spool flanges illustrated in FIG. 3 are spaced by sliding two spool pieces relatively.
Figure 5:
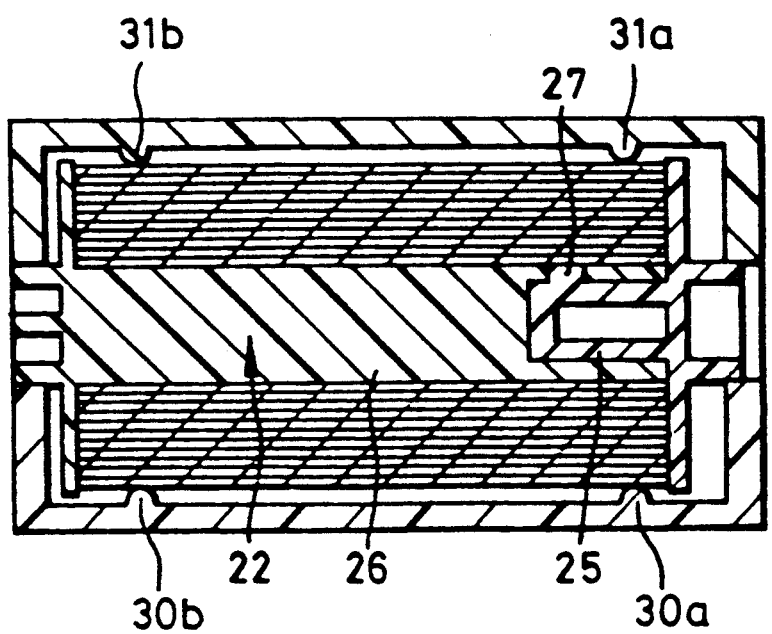
FIG. 5 is a cross section illustrating a state where a roll of film illustrated in FIG. 4 is clamped by the spool flanges.

When the first spool piece 25 is rotated in the film unwinding direction, or counterclockwise in FIG. 3 as observed from the top, the pin 27 moves in the cam groove 28, from the position of FIG. 4 to that of FIG. 5, so as to shorten the spool 22. Because the spool flanges 25a and 26a clamp the roll of film 2, the counterclockwise rotation of the spool 22 never fails to be transmitted to the film leader 43.

The cassette shell 23 includes two shell halves 108 and 109 molded from a resin, e.g. PS resin provided with light-tight properties. Stepped edges 32 are formed on the shell halves 108 and 109 to be welded together. Annular ridges 30a, 30b, 31a and 31b are formed on the inside surface of the cylinder of the cassette shell 23, so as to contact with the outermost turn of the roll of film 2, and keep the roll of film 2 from loosening over the diameter of the spool flanges 25a and 26a. The separating claw 14 is formed on one end of the annular ridge 31a.

The operation of assembling the film cassette of the second embodiment will now be described. The first spool piece 25 is fitted in the second spool piece 26 in order to assemble the spool 22. The first spool piece 25 is rotated in the direction of winding up the photographic film 2 so as to wind the photographic film 2 about the spool 22. The flanges 25a and 26a are relatively distant as illustrated in FIG. 4, so that the photographic film 2 can be wound without friction due to engagement of its lateral edges and the flanges 25a and 26a. The shell halves 108 and 109 are joined together to cover the spool 22.

Ultrasonic vibration is applied to the cassette shell 23 in this state, and the shell halves 108 and 109 are joined together by welding the stepped edges 32. The shaft portions 25b and 26b are in contact over rather a large area, but are free from being welded because the molded resins have different melting points. Therefore, the film leader 43 can be reliably propelled to the outside of the cassette shell 23 even if the cassette shell 23 is assembled with ultrasonic welding.

In the above embodiments, ultrasonic welding is avoided on contact surfaces other than those desired to be welded together by use of two different resins for one film cassette. If lubricant e.g. silicone oil were to be applied to a contact surface of which a pressure contact is small, ultrasonic welding would be avoided even between surfaces of the same resin. It is noted that there is no particular problem relating to the contact of the spool core 4 or the first spool piece 25 with the cassette shell, both molded from PS resin, because an unexpected welding is not likely, and involves little undesirable effect due to the small area in contact inside the bearing holes However, application of a lubricant to such contact surfaces requiring no welding will make the film cassette more reliably free from undesired welding.

To melt and reuse the resin of the film cassettes as collected and withdrawn, efficiency of separating or classifying the parts of the film cassettes as to the material can be improved, because no parts other than the disks 5 and 6 or the second spool piece 26 require removal. If there is a compatibility between the different resins, they can be melted together without classification and reused as molding materials for other purposes.

Figure 6:
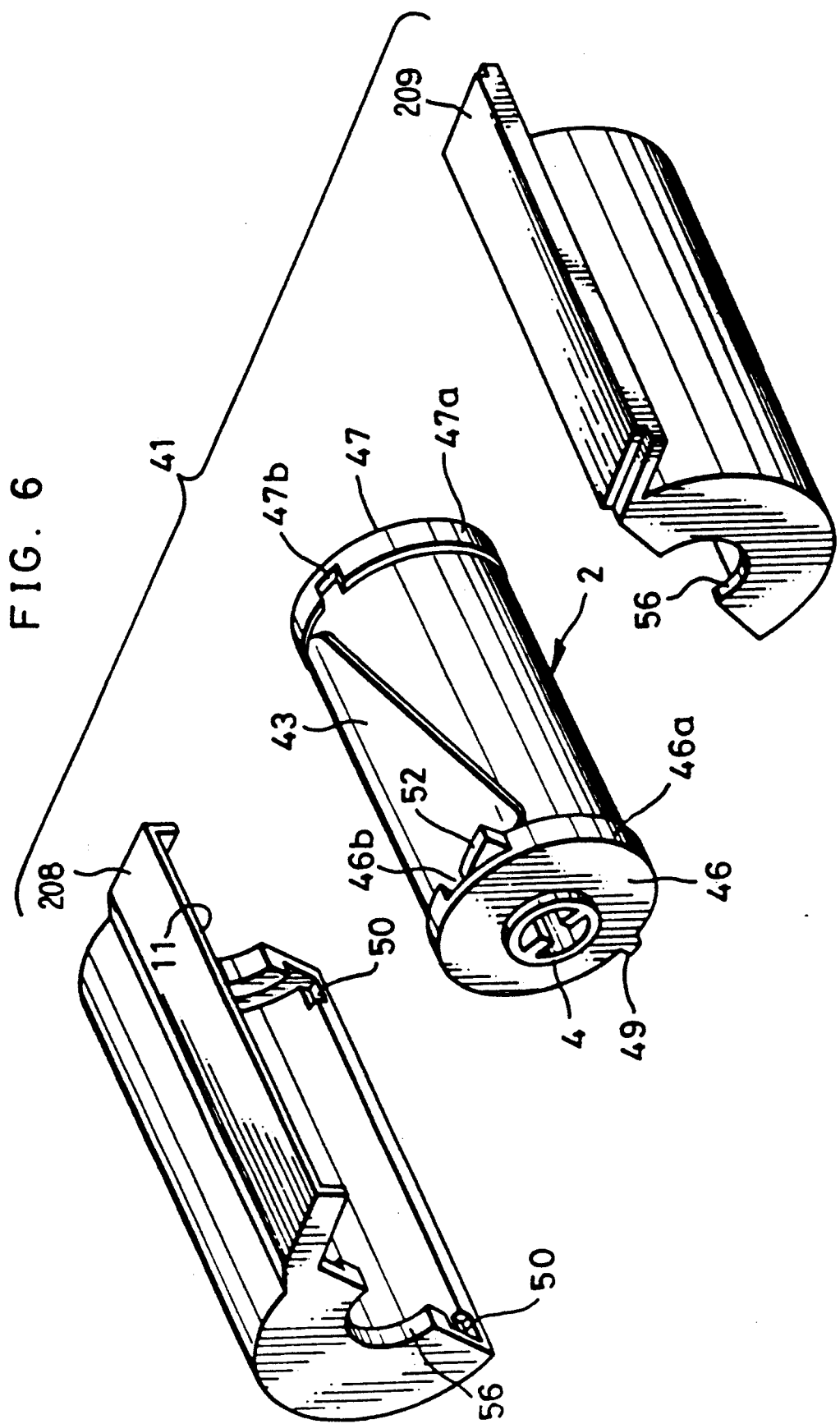
FIG. 6 is an exploded perspective view illustrating a film cassette according to a third preferred embodiment in which friction of the spool flanges is reduced.
Figure 7:
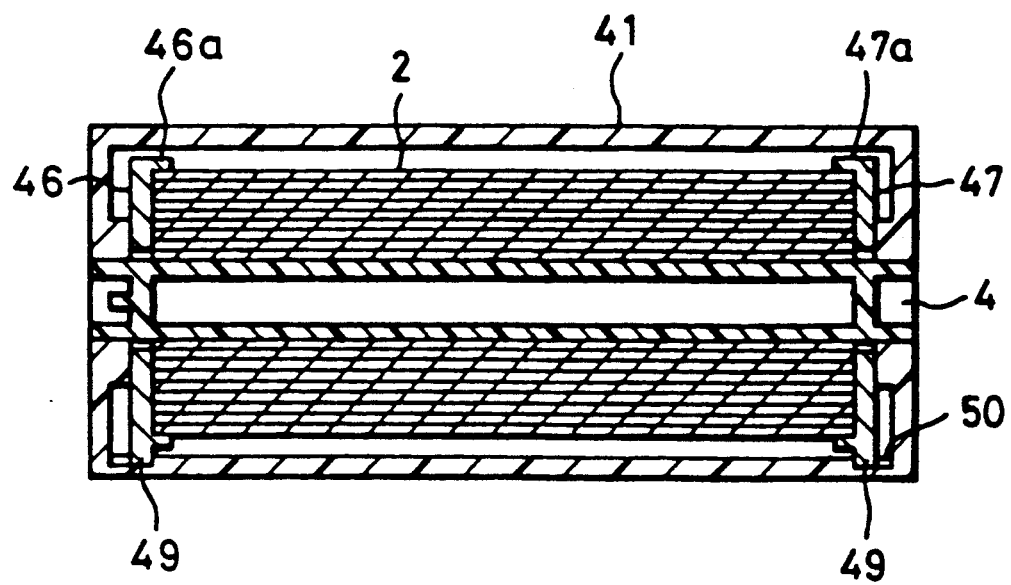
FIG. 7 is a cross section illustrating the film cassette illustrated in FIG. 6.

In a film cassette wherein the spool flanges are in constant contact with the inside of the cassette shell, or the photographic film, under pressure, the necessary torque applied to the spool must increase due to the considerable friction between the cassette shell and the photographic film. FIG. 6 illustrates a third embodiment directed at solving such a problem. The shell halves 208 and 209 and the spool core 4 are respectively molded from a thermoplastic resin such as high-impact polystyrene (HIPS), for example. It is preferable to add silicone as a lubricant in a range from 0.05 to 2.0 percent by weight, and carbon black as a light-shielding material in a range from 0.05 to 3.0 percent by weight. Silicone or carbon black can be added in accordance with the master batch method at the molding time.

A pair of rotatable disks or spool flanges 46 and 47 are fitted on the spool core 4 at each end thereof. Circumferential lips 46a and 47a are integrally formed with the disks 46 and 47 on the circumference thereof so as to project toward the inside of the cassette 41 for preventing the roll of film 2 from loosening. Projections 49 are formed on the disks 46 and 47, and fitted in recesses 50 formed on an inside surface of the cassette shell 41. Accordingly, the disks 46 and 47 are stopped from rotating relative to the cassette shell 41 and sliding in the axial direction. The interval between the inner sides of the disks 46 and 47 corresponds to the width of the roll of film 2, but may be slightly larger than the film width.

A pair of guide spacings or notches 46b and 47b are formed in the circumferential lips 46a and 47a in positions proximate to the film passage slit 11. A guide member 52 for guiding the photographic film 2 is formed integrally with the spool flange 46 on the circumferential lip 46a, adjacent to the notch 46b, in the shape of a claw at its end facing to the notch 46b so as to peel off the film leader 43 from the outermost turn of the roll of film 2. While the roll of film 2 rotates by rotating the spool core 4, the leading end of the film leader 43 arrives in the notches 46b and 47b, through which the film leader 43 is separated from the roll of film 2 by the guide member 52 and is advanced to the film passage slit 11. A guide member 52 for guiding the photographic film 2 is formed integrally with the spool flange 46 on the circumferential lip 46a, adjacent to the notch 46b, in the shape of a claw at its end facing to the notch 46b so as to peel off the film leader 43 from the outermost turn of the roll of film 2. While the roll of film 2 rotates by rotating the spool core 4, the leading end of the film leader 43 passes through the notches 46b and 47b, and the film leader 43 is separated from the roll of film 2 by the guide member 52 and is advanced to the film passage slit 11. Since the disks 46 and 47 do not rotate, the end faces and the outermost turn of the roll of film 2 rub against the inside surfaces of the disks 46 and 47 and the circumferential lips 46a and 47a when the spool core 4 is rotated.

The operation of the third embodiment will now be described. As the spool core 4 is rotated in the film unwinding direction, the roll of film 2 rotates with the spool core 4 without loosening because the outermost turn of the roll of film 2 is restricted by the circumferential lips 46a and 47a. On the other hand, since the disks 46 and 47 are stationary relative to the cassette shell 41, the notches 46b and 47b are always maintained at the same positions even when the spool core 4 rotates.

As the roll of film 2 rotates with the spool core 4, the protruding side of the film leader 43 reaches the notch 46b. At this time, the protruding side is separated from the roll of film 2 by the end of the guide member 52, and passes through the notch 46b. The protruding side is guided toward the film passage slit 11 by the guide member 52, and is passed through the notch 46b. The protruding side is guided toward the film passage slit 11 by the guide member 52. As the roll of film 2 further rotates, the retracted side of the film leader 43 will advance out of the notch 47b and the film leader 43 is advanced out of the cassette shell 41 via the film passage slit 11. The advancement of film leader 43 is performed without error, because the notches 46b and 47b are maintained in proper positions relative to the film passage slit 11.

As is understood from this operation, the outermost turn of the roll of film 2 rubs against the inside surfaces of the circumferential lips 46a and 47a, and the end faces of the roll of film 2 rub against the inside surfaces of the disks 46 and 47, while the spool core 4 is rotated for propelling the film leader 43. To minimize the torque to be applied to the spool core 4, it is necessary to cause the friction between the photographic film 2 and the disks 46 and 47 to be as small as possible.

Figure 8:
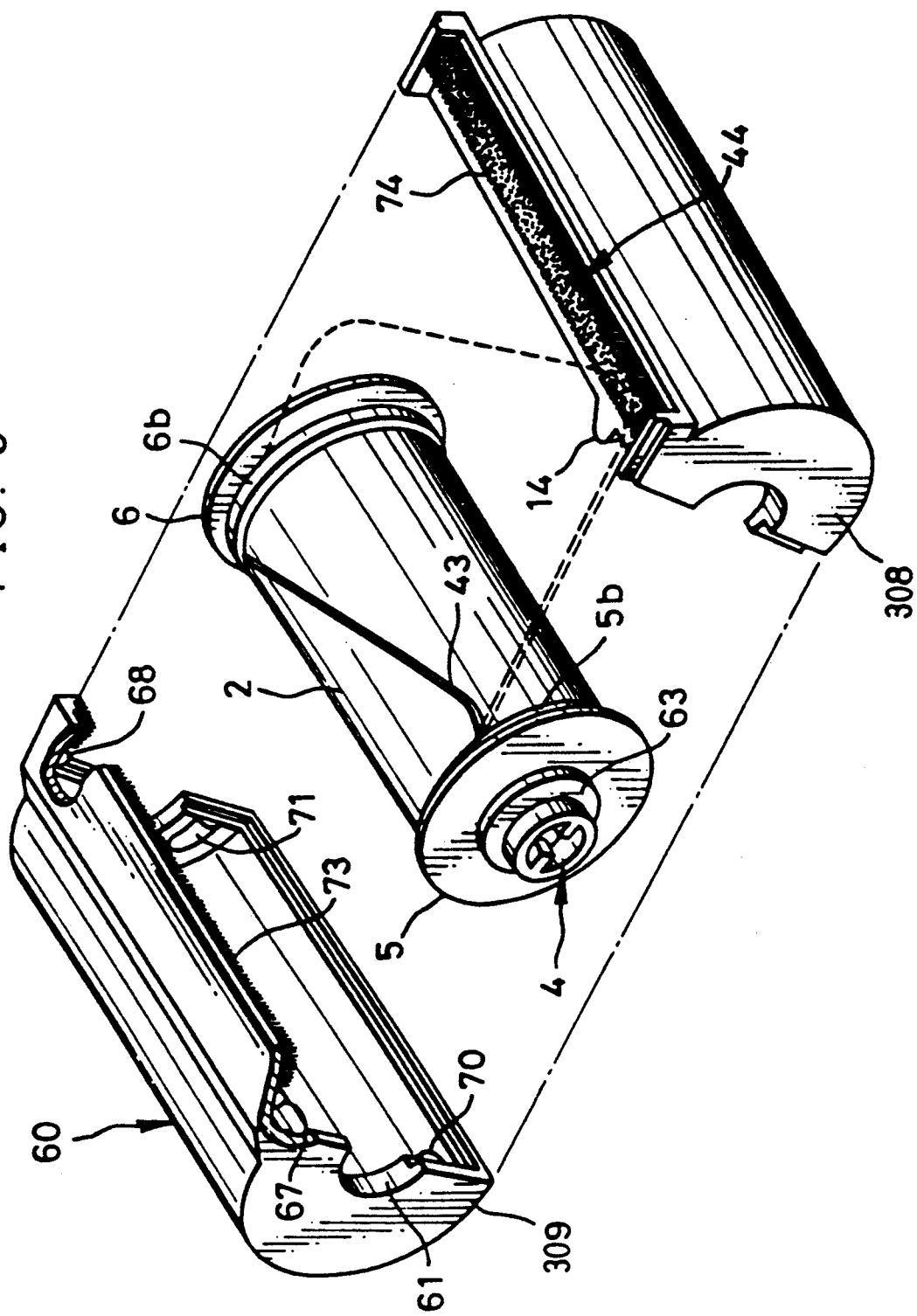
FIG. 8 is an exploded perspective view illustrating a film cassette according to a fourth preferred embodiment.
Figure 9:
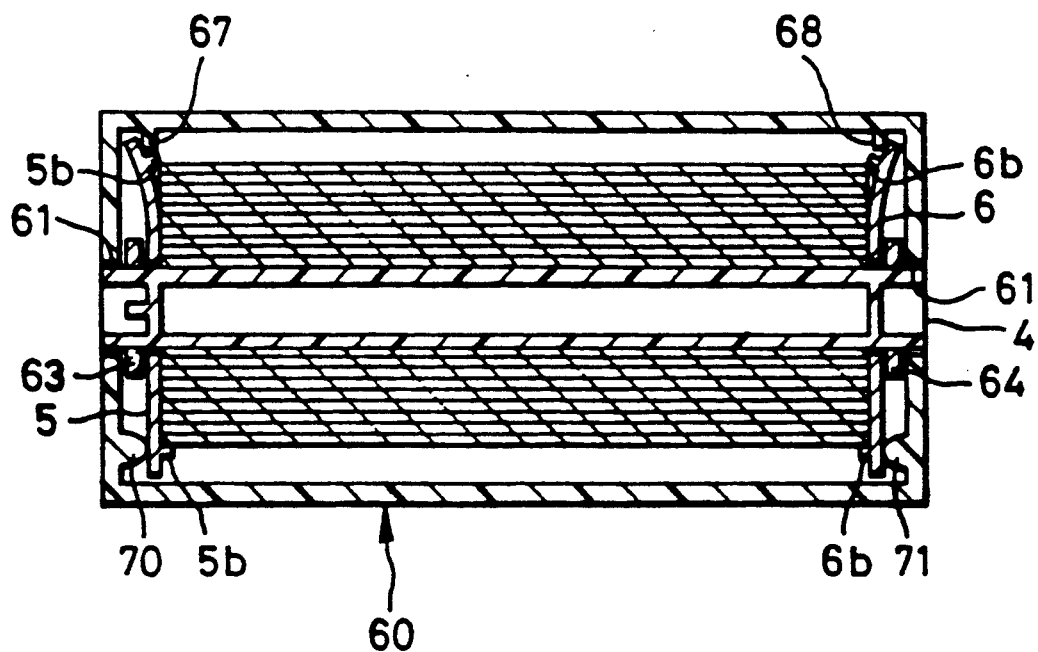
FIG. 9 is a cross section illustrating the film cassette illustrated in FIG. 8.

Referring to FIGS. 8 and 9 illustrating a fourth preferred embodiment, a film cassette includes a cassette shell 60 consisting of the upper and lower shell halves 308 and 309, the spool core 4 being rotatably supported in the cassette shell 60 through bearing holes 61 formed in the shell halves 308 and 309. The photographic film 2 is wound on the spool core 4 with the trailing end fixed thereon The shell halves 308 and 309 are molded from HIPS resin with a lubricant and light-shielding material added thereto.

As is illustrated in FIG. 9, the spool core 4 is loosely fitted in the two disks 5 and 6, and washers 63 and 64 are fitted on the outside of the disks 5 and 6. The inside walls of the disks 5 and 6 have opposed circumferential lips 5b and 6b which contact edges of the outermost turn of the roll of film 2 to prevent the roll from loosening. The radius of the circumferential lips 5b and 6b is smaller than the radius of the disks 5 and 6. The peripheral edges of disks 5 and 6 project from the bottom of the circumferential lips 5b and 6b.

Triangular guide projections 67 and 68 are formed in the film passage slit 11 on the upper shell half 309. The projections 67 and 68 contact the inner periphery of the disks 5 and 6 so as to deform the peripheral edges thereof in the widthwise direction of the photographic film 2 in order to release the roll of film that the disks 5 and 6 and the circumferential lips 5b and 6b. Arcuate ridges 70 and 71, formed on the inside surfaces of the end faces of the shell halves 308 and 309 contact the disks 5 and 6 laterally so as to press the disks 5 and 6 against the end faces of the roll of film 2 so as to prevent the gap between the disks 5 and 6 from being too large.

When loading a camera with the above-described film cassette of the fourth embodiment the spool core 4 is rotated in the film unwinding direction by a film initial-advance mechanism of the camera. Although the photographic film 2 is rotated in the unwinding direction, the ridges 70 and 71 prevent the disks 5 and 6 from spreading outwardly except at portions thereof proximate the film passage slit The circumferential lips 5b and 6b contact both lateral edges of the outermost turn of the photographic film 2 to prevent further loosening thereof. Thus, rotation of the spool core 4 is transmitted to the disks 5 and 6 via the roll of film 2, and causes the roll of film 2 and the disks 5 and 6 to rotate together with the spool 4. Because the ridges 70 and 71 do not reach the vicinity of the film passage slit 11, and because the spreaders 67 and 68 bend the peripheral edges of the disks 5 and 6 outwardly, both lateral edges of the film leader 43 are released from the circumferential lips 5b and 6b. When the spool core 4 is rotated further, the film leader 43 passing the vicinity of the film passage slit 11 is separated from the roll of film 2 by the separating claw 14 without the film jamming. The film then passes the claw 14, on its upper surface, and advances through the film passage slit 11 and outside of the cassette shell 60. It is noted in the present embodiment that the roll of film 2 is prevented from loosening by the disks 5 and 6 clamping the photographic film 2 widthwise, and that the circumferential lips 5b and 6b are not necessarily required.

As is described above, the present film cassette is provided with the disks 5 and 6 in constant contact with the spreaders 67 and 68 and the ridges 70 and 71, so as to be deformed as illustrated in FIG. 9. The lateral edges of the film leader 43 is rubbed against the circumferential lips 5b and 6b prior to propelling the film leader 43. The inside surfaces of the disks 5 and 6 are stationary and rub against the end surfaces of the roll of film 2 during rotation of the roll of film 2 with the spool core 4. Accordingly, the disks 5 and 6 require characteristics of low friction against the cassette shell 60 and the photographic film 2, and a high elasticity, similar to the disks 46 and 47 in FIG. 6. The disks 5 and 6, or 46 and 47 are molded from polyolefin resin, or the like, of high density and high molecular weight.

The disks 5 and 6 or 46 and 47 are integrally formed with the circumferential lips 5b and 6b or 46a or 47a respectively and are constructed from high-density polyolefin, constituted of high-density homopolyethylene resin and/or high-density copolymer resin in polymerization of ethylene and other resins, of which: the density is 0.940 g/cm$^3$ or higher; the Vicat softening point (ASTM D1525: with a load of 1 kg) is 110° C. or higher, preferably 115° C. or higher, more preferably 120° C. or higher; the initial elastic modulus in flexure (ASTM D790:23° C., 3 mm of thickness) is 11,000 to 25,000 kg/cm$^2$, preferably 12,500 to 23,000 kg/cm$^2$, more preferably 15,000 to 20,000 kg/cm$^2$; and the molecular weight is 100,000 to 1,000,000, preferably 100,000 to 800,000, more preferably 300,000 to 700,000.

Because the film cassette may be exposed to sunlight, or left to stand in an automobile, the Vicat softening point or melting point is set to be a minimum of 110° C. so as to avoid thermal deformation even when the temperature of the surfaces of the disks 5 and 6, 46 and 47 approach 80° C. The above range of the initial elastic modulus in flexure is necessitated for imparting suitable elasticity and rigidity to the disks 5 and 6, or 46 and 47. The above range of the molecular weight is necessary for suitable rigidity, suitable abrasion resistance and a lowered coefficient of static friction. If the molecular weight were below 100,000, the resin of the disks 5 and 6 or 46 and 47 would lack the necessary characteristics required for propelling the film leader. If it were over 1,000,000, it would be difficult to practically mold it into parts because such a material is not suitable for injection processes.

It is desirable to add lubricant to the high-density high-molecular weight resin at an amount from 0.05 to 0.5 wt.%, to improve extrudability in injection and to prevent the buildup of static electricity. The optimum amount of lubricant to be added changes dependent upon the type of lubricant to be added changes dependent upon the type of lubricant, because of a balance between bleeding-out and lubricant properties, and between the lubricant property and cost. A lubricant of fatty acid amide type can be added at 0.03 to 1.0 wt.%, preferably 0.06 to 0.7 wt.%, more preferably 0.1 to 0.5 wt.%. A lubricant of silicone can be added at 0.3 to 5.0 wt.%, preferably 0.5 to 3.0 wt.%, more preferably 1.0 to 2.0 wt.%. Examples of lubricants as well as manufacturers thereof are referred to below.

1) Silicone lubricants: dimethyl polysiloxane of various grades and modification thereof (manufactured by Sinetsu Chemical Co., Ltd. and Toray Silicone Co., Ltd.), etc.

2) Oleic acid amide lubricants: ARMO SLIP-CP (merchandise name; manufactured by Nippon Fine Chemical Co., Ltd.), NEWTRON E-18 (merchandise name; manufactured by Nippon Oil and Fats Co., Ltd.), AMIDE-0 (merchandise name; manufactured by Nitto Chemical Industry Co., Ltd.), ALFLOW E-10 (merchandise name; manufactured by Nippon Oil and Fats, Co., Ltd.), DIAMID 0-200 (merchandise name; manufactured by Nippon Kasei Chemical Co., Ltd.), etc.

3) Erucic acid amide lubricants: ALFLOW P-10 (merchandise name; manufactured by Nippon Oil and Fats Co., Ltd.), etc.

4) Stearic acid amide lubricants: ALFLOW S-10 (merchandise name; manufactured by Nippon Oil and Fats Co., Ltd.), NEWTRON 2 (merchandise name; manufactured by Nippon Fine Chemical Co., Ltd.), DIAMID 200 (merchandise name; manufactured by Nippon Kasei Chemical Co., Ltd.), etc.

5) Bis fatty acid amide lubricants: BISAMIDE (merchandise name; manufactured by Nitto Chemical Industry Co., Ltd.), DIAMID 200 BIS (merchandise name; manufactured by Nippon Kasei Chemical Co., Ltd.), ARMO WAX-EBS (merchandise name; manufactured by Lion Akzo Co., Ltd.), etc.

6) Alkyl amine lubricants: ELECTROSTRIPPER TS-2 (merchandise name; manufactured by Kao Corporation), etc.

7) Hydrocarbon lubricants: liquid paraffin, natural paraffin, microwax, synthetic paraffin, polyethylene wax, polypropylene wax, chlorinated hydrocarbon, fluorocarbon, etc.

8) Fatty acid lubricants: higher fatty acid (whose preferable number of carbon atoms is $C_{12}$ or more), oxy fatty acid, etc.

9) Ester lubrications: fatty acid lower alcohol ester, fatty acid polyvalent alcohol ester, fatty acid polyglycol ester, fatty acid fatty alcohol ester, etc.

10) Alcohol lubricants: polyvalent alcohol, polyglycol, polyglycerol, etc.

11) Metallic soaps: compounds of higher fatty acid such as lauric acid, stearic acid, ricinoleic acid, naphthenic acid and oleic acid and metals such as Li, Mg, Ca, Sr, Ba, Zn, Cd, Al, Sn and Pb, etc.

The disks 5, 6, 46 and 47 must have light-shielding properties, because outer light must be prevented from entering the spacings in the bearing holes 56 and 61 around the spool core 4. A good example of a light screen or light-shielding material added to the resin is the inorganic compound as referred to below.

1) Oxide, such as: silica, diatomaceous earth, alumina titanium oxide, iron oxide, zinc oxide, magnesium oxide, antimony oxide, barium ferrite, strontium ferrite, beryllium oxide, pumice stone, pumice stone balloon, and alumina fiber.

2) Hydroxide, such as: aluminum hydroxide, magnesium hydroxide, and basic magnesium carbonate.

3) Carbonate, such as: calcium carbonate, magnesium carbonate, dolomite, and danalite.

4) Sulfate and sulfite, such as: calcium sulfate, barium sulfate, ammonium sulfate, and calcium sulfite.

5) Silicate, such as: talc, clay, mica, asbestos, glass fiber, glass balloon, glass bead, calcium silicate, montmorillonite, and bentonite.

6) Carbon, such as: carbon black, graphite, carbon fiber, and carbon hollow sphere.

7) Other compounds, such as iron powder, copper powder, lead powder, aluminum powder, molybdenum sulfide, boron fiber, silicon carbide fiber, brass fiber, potassium netaborate, calcium borate, sodium borate, and aluminum paste.

Figure 10:
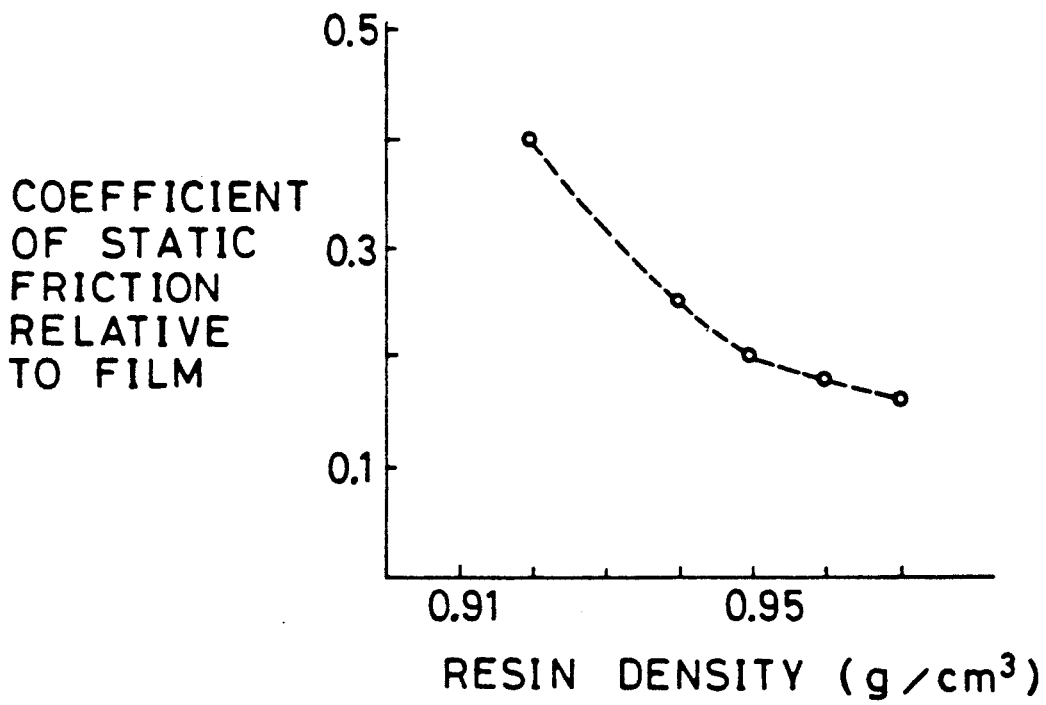
FIG. 10 is a graph illustrating a coefficient of static friction between polyolefin resin and the photographic film.

Carbon black is the most preferable, because it has little effect on the photographic film 2, a great capacity for shielding light, and is inexpensive. Carbon black is classified according to raw materials as gas black, furnace black, channel black, anthracene black, acetylene black, Ketchen carbon black, thermal black lamp black, oil smoke, pine smoke, animal black, and vegetable black. Among the above, furnace black is preferable because of its light-shielding capacity, low cost and high quality. Acetylene black and Ketchen carbon black, denatured by-products of carbon black, are preferable because of light-shielding capacity as well as antistatic properties. However, these products can be relatively expensive. Different types of carbon black can be mixed in accordance with desired properties. Among several methods of including light-shielding material in polyethylene polymer, the master batch method is preferable because of low cost and minimal environmental problems FIG. 10 is a graph illustrating a change of the coefficient of static friction of the polyolefin resin, used for molding the disks 5, 6, 46 and 47, against the photographic film while the density of the polyolefin resin is changed. The sample used for the photographic film was HG 400 manufactured by Fuji Photo Film Co., Ltd. The polyolefin resin to be measured was injected into size of $50 \times 100 \times 2$ mm sheet, which was rubbed against the back surface of the photographic film under the load of 300 g in accordance with the gradient method. As is understood from this graph, the friction coefficient was below 0.25 when the density was over $0.940$ g/cm$^3$. This density of the resin is satisfactory for the disks 5, 6, 46 and 47 because of the resulting low friction.

Figure 11:
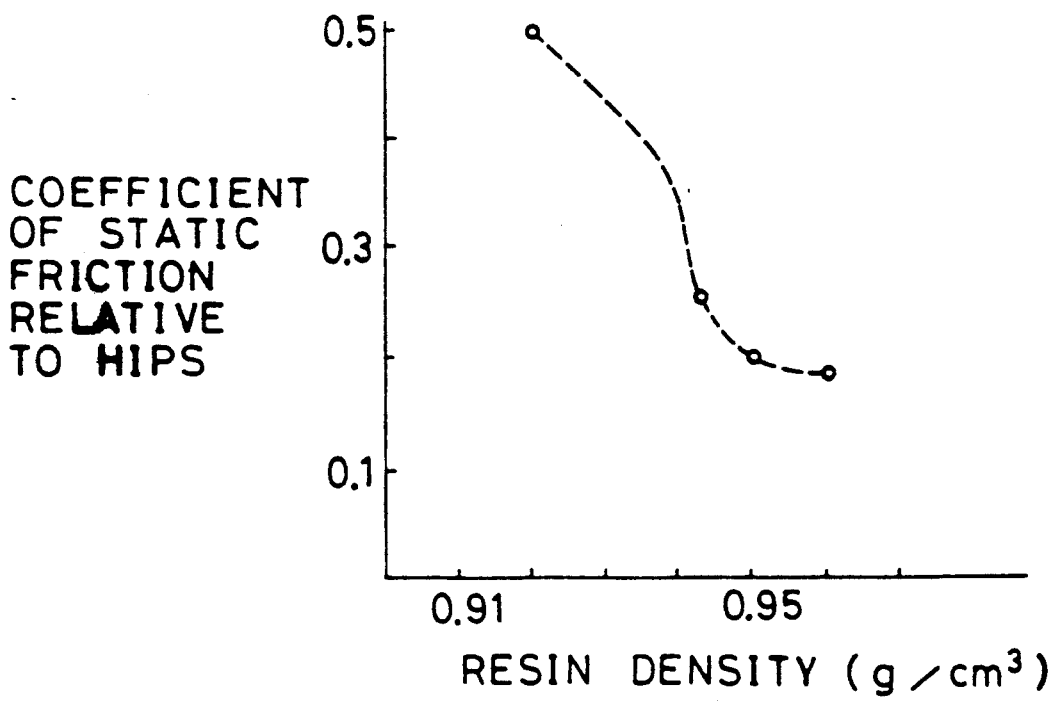
FIG. 11 is a graph illustrating a coefficient of static friction between the polyolefin resin and the HIPS resin.

FIG. 11 is a graph illustrating a change of the coefficient of static friction of the polyolefin resin against the HIPS resin used for molding the cassette shell 41 or 60 Data was obtained in the manner the above data for FIG. 10. The graph also shows that low friction results when the density of the polyolefin is set to be over 0.940 g/cm$^3$.

Figure 12:
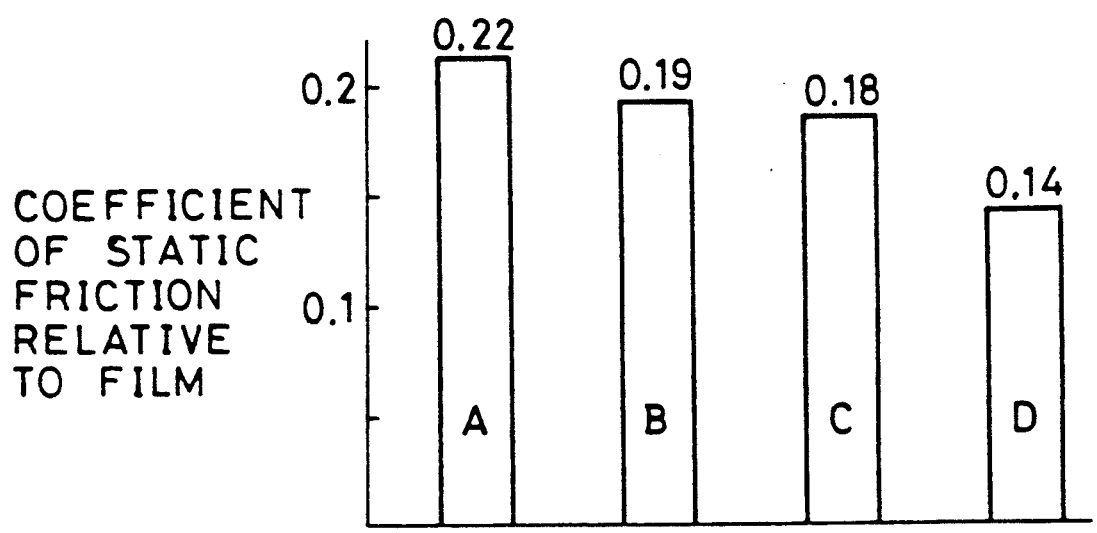
FIG. 12 is a graph similar to FIG. 10, in which lubricant is added to the polyolefin resin.
Figure 13:
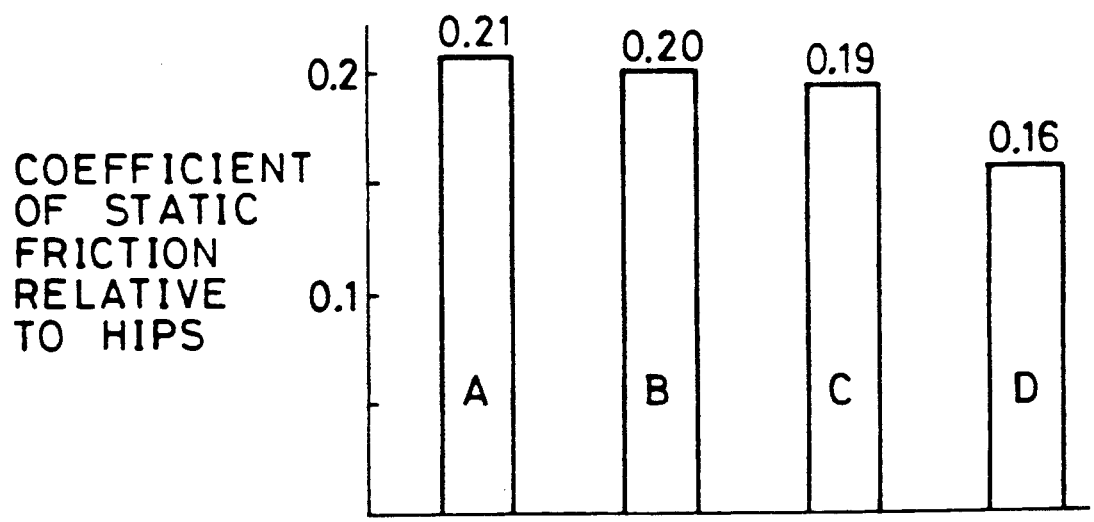
FIG. 13 is a graph similar to FIG. 11, in which lubricant is added to the polyolefin resin.

FIGS. 12 and 13 are graphs, obtained in a manner similar to FIGS. 10 and 11, illustrating a change of the friction coefficients of the polyolefin resin including lubricants with reference to the photographic film and the polyolefin resin. The appropriate polyolefin in use was LUBMER L4000 (manufactured by Mitsui Petrochemical Industries, Ltd.), Example A was LUBMER L4000 having no additive. Sample B included silicone added thereto Sample C included fatty acid amide added to LUBMER L4000. Sample D included both silicone and fatty acid amide added thereto The data as obtained from measurement of these samples illustrates that proper addition of lubricants further reduces the coefficient of static friction.

The cassette shell 41 or 60 and the spool 45 are molded from HIPS in the preferred embodiments. The resin as material for forming the cassette shell and the spool is preferably a thermoplastic resin, or the like, which is inexpensive and adaptable to injection molding, such as PS resin (HIPS resin including rubber, among others), ABS resin, and polyolefin resin (high-density PE resin, homopolypropylene resin, propylene-/alpha olefin block copolymer resin, among others). Of course, the material should include a light-shielding material or light screen as a component, such as carbon black pigments, black dye, metallic powder, aluminum paste, and the like. Most desirably, the film cassette is constructed of a material of which the main component is a polyblend of HIPS resin and PP resin (e.g. homopolypropylene resin, propylene/ethylene random copolymer resin, and propylene/ethylene block copolymer resin), or a polyblend of at least two of PP resin, ethylene copolymer resin, and rubber.

Thermoplastic resins that are adaptable to injection molding for the cassette shell and the spool are not limited to the above-mentioned examples, but can be any kind of thermoplastic resin, or the like. Additives can be added to the resin in order to provide desirable characteristics, such as enlarging injection capacity and prevent deterioration. Additives and examples thereof added as required to the resin for forming the cassette shell and the spool are referred to as below. Naturally, additives to be used are not limited to these examples but can be any known kind and depend upon the properties desired.

1) Plasticizer: phthalate ester, glycol ester, fatty acid ester, phosphate ester, etc.

2) Stabilizer: lead type, cadmium type, zinc type, alkali earth metal type, organo-tin type, etc.

3) Flame retardant: phosphate ester, halogenated phosphate ester, halide, inorganic matter, phosphorous-inducing polyol, etc.

4) Filler: alumina, kaolin, clay, calcium carbonate, mica, talc, titanium oxide, silica, etc.

5) Reinforcer: glass roving, metal fiber, glass fiber, milled glass fiber, carbon fiber, etc.

6) Foaming agent: inorganic foaming agents (ammonium carbonate and sodium bicarbonate), organic foaming agents (nitroso type and azo type), etc.

7) Vulcanizer: vulcanizing accelerator, supplement accelerator, etc.

8) Deterioration inhibitor: ultraviolet light absorber, metal inactivation agent, peroxide decomposer, etc.

9) Coupling agent silane type, titanate type, chrome type, aluminum type, etc.

10) Various thermoplastic resins, rubber, etc.

11) Nucleator: organic nucleator (dibenzylidene sorbitol compound), inorganic nucleator (calcium carbonate), etc.

The novel features described above according to the present invention are also applicable to film cassettes having constructions different from the preferred embodiments, for example a film cassette in which a pair of spool flanges are formed integrally with the spool core so that the spool flanges themselves clamp the photographic film widthwise; a film cassette in the shape the same as that of FIGS. 1 and 2 but in which the disks or spool flanges are formed integrally with the spool core; and a film cassette in the shape as illustrated in FIGS. 3 to 5 having a one piece spool. For these alternative constructions, the spool can be molded together with the spool flanges from the polyolefin resin of the high density and the high molecular weight.

It is also preferable to mold the spool core and the spool flanges integrally from the HIPS resin superior in suitability for dimensional precision and injection molding, to mold the circumferential lips from the inventive polyolefin resin of the high density and the high molecular weight, and to fix the latter on the former.

Although the present invention has been fully described by accompanying drawings, various changes and modifications will be apparent to those having skill in this field. Therefore, unless otherwise these changes and modifications depart from the scope of the present invention, as defined by the appealed claims, they should be construed as included therein.

WHAT IS CLAIMED IS:

1. A photographic film cassette comprising:
   a cassette shell consisting of at least two molded shell components;
   a molded spool core rotatably supported in said cassette shell;
   a photographic film wound in a roll on said spool core;
   a pair of flanges being rotatably provided on ends of said spool core and positioned so as to contact with end faces of said photographic film;
   a looseness preventing device positioned with respect to said flanges so as to contact an outermost turn of said photographic film so as to prevent said photographic film from loosening; and
   a releasing device provided on said cassette shell and positioned so as to release said outermost turn from said looseness prevention device so as to cause a leader portion of said film to be propelled to an outside of said cassette shell by rotation of said spool core;
   said flanges being molded from a first resin which has a first melting point, at least one of said cassette shell or said spool core being molded from a second resin having a second melting point, different from said first melting point.

2. A photographic film cassette as claimed in claim 1, wherein a difference between said first melting point and said second melting point is at least 20 degrees Celsius.

3. A photographic film cassette as claimed in claim 2, wherein said first melting point is higher than said second melting point so as to prevent said spool flanges from being welded to said shell components when joining said shell components together by applying ultrasonic waves.

4. A photographic film cassette as claimed in claim 3, wherein said at least two shell components comprise upper and lower shell halves between which said spool core is rotatably supported, said shell halves defining a film passage slit therebetween.

5. A photographic film cassette as claimed in claim 4, wherein said first resin of said spool flanges has greater elasticity than said second resin.

6. A photographic film cassette as claimed in claim 5, wherein a coefficient of friction between said spool flanges and said photographic film is at most 0.25.

7. A photographic film cassette as claimed in claim 6, wherein said upper and lower shell halves are molded from polystyrene resin.

8. A photographic film cassette as claimed in claim 7, wherein:
   said looseness preventing device consists of circumferential lips formed on circumferences of each of said spool flanges and projecting toward the opposite of said spool flanges; and
   said releasing device comprises a pair of spreaders formed on said cassette shell so as to engage with said circumferential lips in order to spread said spool flanges outwardly.

9. A photographic film cassette comprising:
   a spool consisting of first and second molded spool pieces which are axially slidable relative to each other, said first and second molded spool pieces being provided with first and second spool flanges respective, a photographic film being wound in a roll on said spool;
   a cassette shell consisting of at least two molded shell components for rotatably supporting said spool;
   a looseness preventing device provided on said cassette shell and positioned so as to contact with an outermost turn of said roll of film in order to prevent said photographic film from loosening; and
   a motion transmitting device provided on first and second spool pieces so as to shorten said spool in order to bring said spool flanges closer to each other in accordance with rotation of said spool, said spool flanges clamping a film leader portion so as to release said film leader from said looseness preventing device so as to allow said film leader to be propelled to an outside of said cassette shell by said rotation;
   a first resin used for molding said second spool piece having a different melting point from a second resin used for molding said cassette shell and said first spool piece.

10. A photographic film cassette as claimed in claim 9, wherein a difference between a melting point of said first resin and that of said second resin is at least 20 degrees Celsius 11. A photographic film cassette as claimed in claim 10, wherein said first resin has a higher melting point than said second resin in order to prevent said two spool pieces from being welded together when joining said shell components together by ultrasonic waves.

12. A photographic film cassette as claimed in claim 11, wherein said at least two shell components comprise upper and lower shell halves between which said spool is supported, said upper and lower shell halves defining a film passage therebetween 13. A photographic film cassette as claimed in claim 12, wherein a coefficient of friction between said first resin and said photographic film is at most 0.25.

14. A photographic film cassette as claimed in claim 13, wherein said two upper and lower halves are molded from polystyrene resin.

15. A photographic film cassette as claimed in claim 14, wherein:
   said looseness preventing device consists of annular ridges formed on an inside surface of said cassette shell so as to project toward said roll of film; and
   said motion transmitting device includes, a cam projection formed on said first spool piece and a cam groove formed in said second spool piece for receiving said cam projection and for allowing said first and second spool pieces to slide relative to each other in cooperation with said cam projection so as to shorten said spool when said first spool piece is rotated relative to said second spool piece in a direction of winding up said photographic film.

16. A photographic film cassette as claimed in claim 15, wherein said first spool piece is an inner spool piece provided with a first spool flange and a first shaft portion and said second spool piece is an outer spool piece provided with a second flange and a second shaft portion having a tubular spacing for receiving said first shaft portion.

17. A photographic film cassette comprising:

a spool core having a photographic film wound in a roll thereon;

a cassette shell consisting of at least two shell components, said at least two shell components comprise upper and lower shell halves between which said spool core is supported in a rotatable manner, said shell haves defining a film passage slit therebetween; and a pair of spool flanges rotatably fitted on said spool core and fixed with respect to said cassette shell so as to be kept from rotating even when said spool core rotates, and so as to contact both end faces of said roll of film, said spool flanges further include a light-shielding material and at least one type of lubricant;

circumferential lips formed on respective circumferential portions of said flanges for contact with an outermost turn of said roll of film so as to cause said roll of film to rotate together with said spool core without loosening when said spool core is rotated in a direction of unwinding said photographic film, a notch being formed on each of said circumferential lips proximate said film passage slit, wherein a film leader portion, separated from said roll of film, exits said cassette through said notches and is propelled to an outside of said cassette shell by rotating said spool core;

said spool flanges being molded from a material including polyolefin resin having a density of at least 0.940 g/cm$^3$ and a molecular weight of between 100,000 and 1,000,000 in order to reduce friction against said cassette shell and said photographic film, first and second coefficients of static friction of said spool flanges against said cassette shell and said photographic film respectively are at most 0.25.

18. A photographic film cassette as claimed in claim 17, wherein a guide member is formed on one of said circumferential lips for guiding a lateral side of said film leader portion, passing through one of said notches, toward said film passage slit.

19. A photographic film cassette as claimed in claim 18, wherein said guide member is formed proximate an edge of one of said notches, and a claw is formed on said edge for separating said film leader portion from said roll of film.

20. A photographic film cassette as claimed in claim 19, further comprising:

projections formed on said disks so as to project in a radial direction of said disks;

recesses being formed on an inside surface of said cassette shell so as to engage with said projections in order to prevent said disks from sliding axially and rotating.

21. A photographic film cassette, comprising:

a cassette shell consisting of at least two molded shell components; and a spool core rotatably supported in said cassette shell, said spool core having a photographic film wound thereon;

portions of said film cassette which are to be ultrasonically welded together being constructed of a first resin and portions of the cassette which are not to be ultrasonically welded being constructed of a second resin;

said first resin having a lower melting point than said second resin.

* * * * *